US007101067B2

(12) United States Patent
Woodward

(10) Patent No.: US 7,101,067 B2
(45) Date of Patent: Sep. 5, 2006

(54) DUAL BEAM HIGH INTENSITY DISCHARGE REFLECTOR

(75) Inventor: Ronald O. Woodward, Yorktown, VA (US)

(73) Assignee: Decoma International Inc., Concord (CA)

(*) Notice: Subject to any disclaimer, the term of this patent is extended or adjusted under 35 U.S.C. 154(b) by 53 days.

(21) Appl. No.: 10/888,393

(22) Filed: Jul. 9, 2004

(65) Prior Publication Data

US 2006/0007698 A1 Jan. 12, 2006

(51) Int. Cl.
*B60Q 1/00* (2006.01)

(52) U.S. Cl. ...................... 362/539; 362/279; 362/290; 362/325; 362/467

(58) Field of Classification Search ................ 362/279, 362/282, 290–91, 319, 322–24, 465, 467, 362/512–13, 539
See application file for complete search history.

(56) References Cited

U.S. PATENT DOCUMENTS 188,700 A * 3/1877 Von Otter ..................... 116/18
2,692,939 A * 10/1954 Crowther .................... 362/291
4,338,655 A 7/1982 Gulliksen et al.
4,800,473 A * 1/1989 Tremblay ................... 362/217
4,855,884 A 8/1989 Richardson
5,023,758 A 6/1991 Allen et al.
5,029,050 A 7/1991 Bergkvist
5,077,649 A * 12/1991 Jackel et al. ................ 362/325
5,142,455 A 8/1992 Kosmatka
6,190,029 B1 2/2001 Taniuchi et al.
6,234,655 B1 5/2001 Suehiro et al.
6,334,702 B1 1/2002 Albou
6,447,151 B1 9/2002 Jones
2004/0202004 A1* 10/2004 Van Duyn .................. 362/512
2004/0213010 A1* 10/2004 Van Duyn .................. 362/512

* cited by examiner

*Primary Examiner*—John Anthony Ward
*Assistant Examiner*—Adam C. Rehm
(74) *Attorney, Agent, or Firm*—Clark Hill PLC

(57) ABSTRACT

A headlamp assembly for producing high and low beam patterns includes a housing having a reflector. The reflector includes high and low beam reflector surfaces. A light source is disposed within the housing for producing light rays projecting towards the high and low beam reflector surfaces. A plurality of shafts extends alongside the light source. A drive is operatively connected to the plurality of shafts for rotation thereof. A shield is connected to the plurality of shafts. Activation of the drive rotates the plurality of shafts to selectively move the shield between an open position, in which the light rays project towards and reflect off of the high beam reflector surfaces to produce the high beam pattern, and a closed position, in which the light rays project towards and reflect off of the low beam reflector surfaces to produce the low beam pattern while the shield blocks a portion of the light rays from projecting towards the high beam reflector surfaces.

5 Claims, 8 Drawing Sheets

DUAL BEAM HIGH INTENSITY DISCHARGE REFLECTOR

FIELD OF THE INVENTION

The invention relates to a headlamp for a motor vehicle. More particularly, the invention relates to a headlamp including a movable shield or louver for producing high and low beam patterns from a single light source.

DESCRIPTION OF RELATED ART

A headlamp for a motor vehicle typically produces a low beam for preventing glare to oncoming drivers and a high beam for providing optimal visibility at times when glare is not a concern. The low and high beams can be produced using two distinct light sources. These light sources include a high intensity discharge (HID) light source for producing the low beam and a tungsten light source for producing the high beam. The use, however, of two light sources increases the cost of the headlamp. Also, because two distinct light sources are utilized, a larger space along a front end of the motor vehicle is required to house the headlamp. In addition, it has been observed that the tungsten light source produces an unattractive yellow light that is not as effective as white light.

Recent headlamp approaches have focused on using a single light source to produce both the low and high beams. One approach involves moving a reflector relative to a light source or vice versa. U.S. Pat. No. 5,142,455 discloses a headlamp having a light source fixedly mounted within a housing. The housing includes slots along an internal surface. A reflector includes flexible and resilient tabs that enter the slots to attach the reflector to the housing. An actuator moves the reflector between a first position, in which the tabs are unflexed and the reflector is positioned to produce a low beam, and a second position, in which the tabs are fully flexed and the reflector is positioned to produce a high beam.

Other headlamp approaches produce the high and low beams by utilizing a movable shield to selectively block portions of a reflector. One example is shown in U.S. Pat. No. 5,029,050, which discloses a dippable headlamp. The headlamp includes a light source that emits visible light and ultraviolet light. The light source and a reflector simultaneously transmit a high beam lobe and a low beam lobe. The headlamp also includes a filter, which filters out visible light but is transparent to ultra-violet light. The filter moves between a first position, in which the filter is located out of the beam path for transmission of a light lobe, and a second position, in which the filter is located in the beam path for at least that part of the light lobe. Thus, when the filter is in the second position, only ultraviolet light is transmitted in that part of the transmitted light lobe, which accounts for the difference between the high and low beam lobes.

Another example of a movable shield is shown in U.S. Pat. No. 6,190,029, which discloses a headlamp with a beam distribution switch mechanism. The headlamp includes a light source disposed within a housing. The beam distribution switch mechanism includes a hood positioned in front of the light source. The hood includes a fixed member having a cut portion, and a moving member for opening and closing the cut portion. A reflector includes a first reflecting surface for reflecting the light from the light source to produce a low beam when the cut portion is closed. The reflector also includes a second reflector surface for reflecting the light from the light source to produce a high beam when the cut portion is open.

SUMMARY OF THE INVENTION

According to one aspect of the invention, a headlamp assembly for producing high and low beam patterns includes a housing having a reflector. The reflector includes high and low beam reflector surfaces. A light source is disposed within the housing for producing light rays projecting towards the high and low beam reflector surfaces. A plurality of shafts extends alongside the light source. A drive is operatively connected to the plurality of shafts for rotation thereof. A shield is connected to the plurality of shafts. Activation of the drive rotates the plurality of shafts to selectively move the shield between an open position, in which the light rays project towards and reflect off of the high beam reflector surfaces to produce the high beam pattern, and a closed position, in which the light rays project towards and reflect off of the low beam reflector surfaces to produce the low beam pattern while the shield blocks a portion of the light rays from projecting towards the high beam reflector surfaces.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
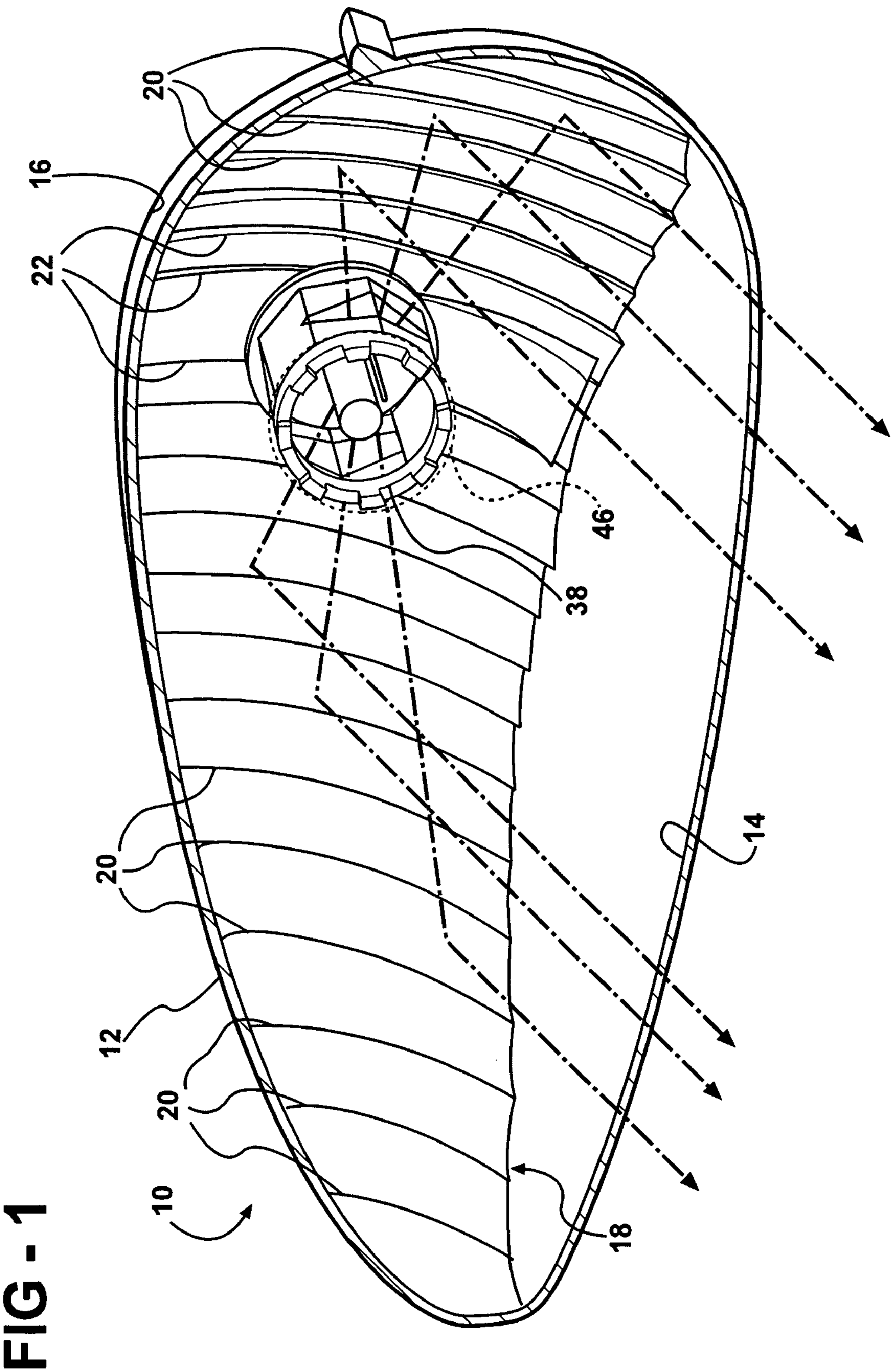
FIG. 1 is a perspective view of a headlamp assembly configured to produce a low beam pattern.

Referring to FIG. 1, a headlamp assembly, generally shown at 10, for a motor vehicle (not shown) includes a housing 12 defining an opening 14. The housing 12 includes an outer surface 16 and a reflector, generally indicated at 18. In a preferred embodiment, the reflector 18 extends along at least part of a contoured inner surface of the housing 12. It is, however, appreciated that the reflector 18 may be one or more separate components disposed within the housing 12.

The reflector 18 may be formed from a polymeric material or a suitable metal. The reflector 18 includes low 20 and high 22 beam reflector surfaces. The low beam reflector surfaces 20 are shaped to generate a low beam pattern. The high beam reflector surfaces 22 are shaped to generate a high beam pattern.

Figure 2:
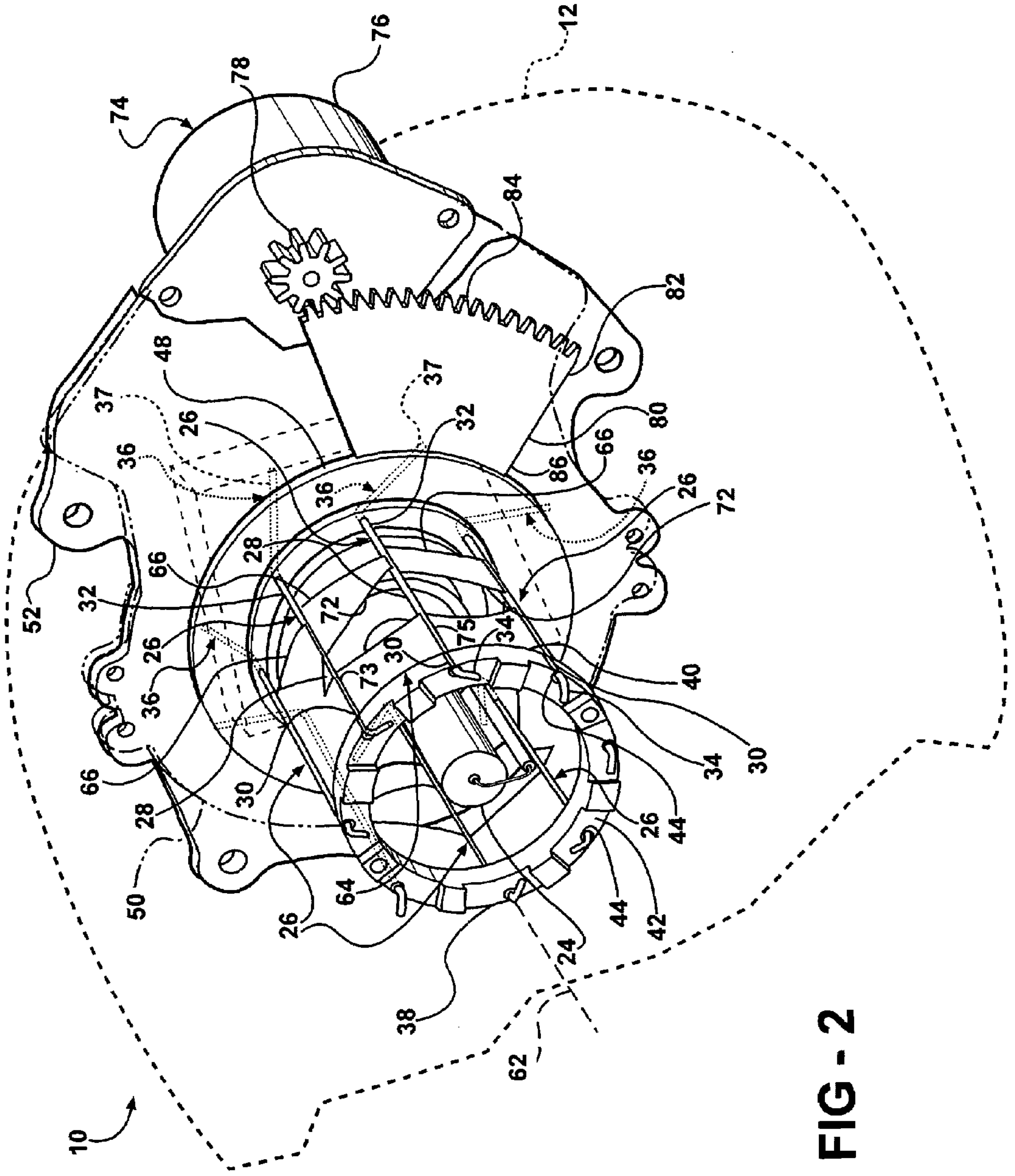
FIG. 2 is a fragmentary, perspective view of the headlamp assembly including a shield in a closed position for producing the low beam pattern.

Referring to FIG. 2, a light source 24 is disposed within the opening 14 of the housing 12, and coupled to and supported by the housing 12. The light source 24 produces light rays that reflect off of the low 20 and high 22 beam reflector surfaces, and project forward through a lens (not shown) in the low and high beam patterns, shown in FIGS. 1 and 4 respectively, to illuminate an area in front of the motor vehicle. In the preferred embodiment, the light source 24 is a high intensity discharge (HID) light.

Referring again to FIG. 2, a plurality of generally parallel and equally spaced apart elongated shafts, each generally indicated at 26, extends circumferentially about the light source 24 in a surrounding relationship. More specifically, the plurality of shafts 26 surrounds the light source 24 in a generally circular formation and extends generally perpendicularly from an inner surface of the housing 12 towards the opening 14 thereof. Each of the plurality of shafts 26 includes a central segment 28 extending between a front end 30 and a back end 32. In addition, each of the plurality of shafts 26 includes a front leg 34 extending out from the front end 30, and a back leg, generally indicated at 36, extending out from the back end 32 to a distal end 37.

Each of the plurality of shafts 26 is coupled to a support ring 38, which includes an annular side wall 40 and a top surface 42. The side wall 40 includes a plurality of channels 44 for receiving and rotatably supporting the front end 30 of each of the plurality of shafts 26. When the plurality of shafts 26 is received within the plurality of channels 44, the front legs 34 rest upon the top surface 42 of the support ring 38. Thus, the support ring 38 supports the plurality of shafts 26. In addition, the support ring 38 supports a bulb cap 46, shown in FIG. 5, which covers the front of the light source 24. The bulb cap 46 retains the plurality of shafts 26 in the support ring 38 by trapping the shafts 26 in channels 44 and the front legs 34 between the top surface 42 and the end of the bulb cap 46.

Figure 3:
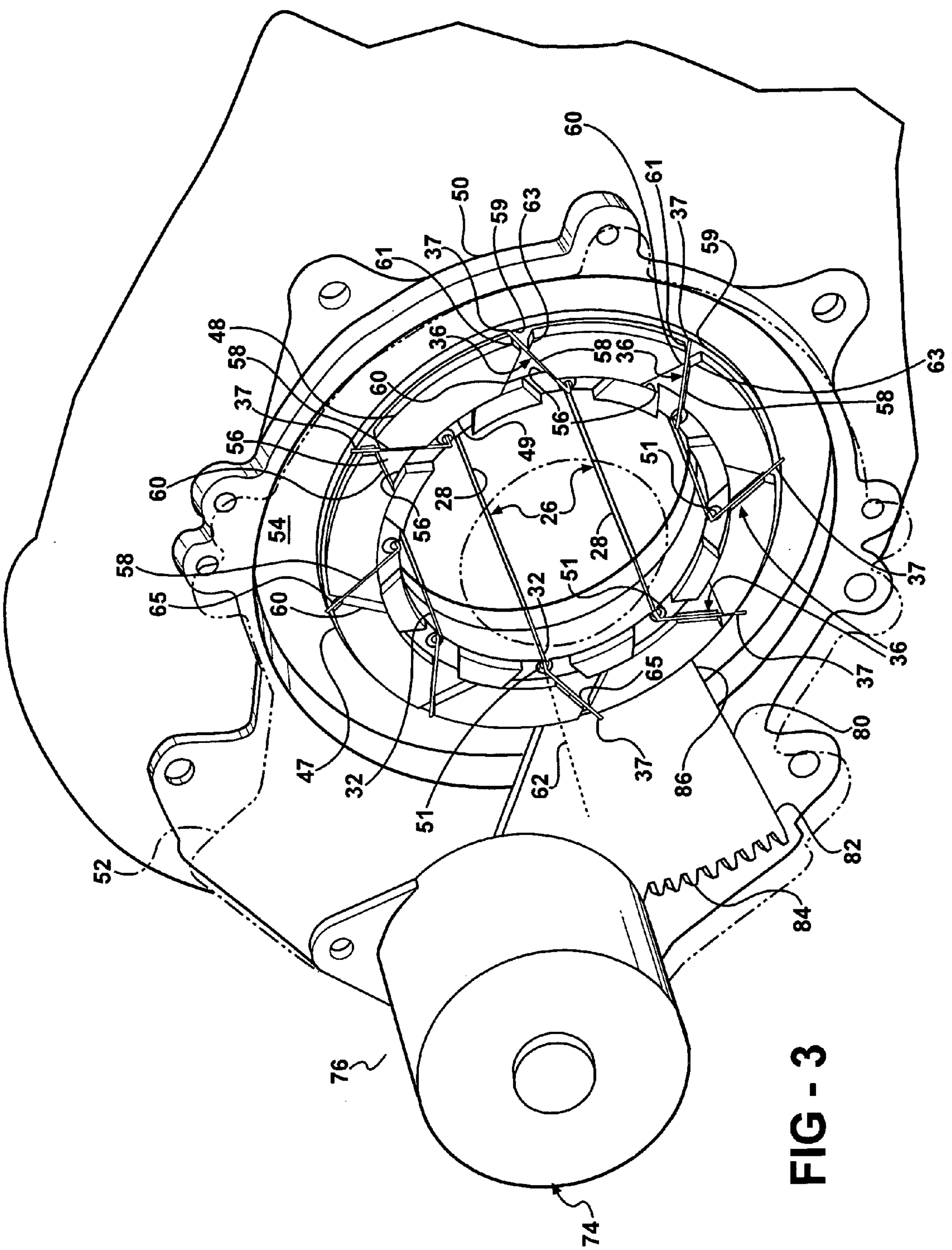
FIG. 3 is a rear, perspective view of the headlamp assembly, partially cut away, with the shield in the closed position.

Referring to FIG. 3, an annular ring 48 is rotatably disposed between an inner plate 50 and an outer plate 52, both of which are fixedly mounted along the outer surface 16 of the housing 12. The back leg 36 of each of the plurality of shafts 26 is operatively coupled to the annular ring 48. The annular ring 48 includes a back surface 54 defining a plurality of major notches 56. More specifically, each of the plurality of major notches 56 is generally V-shaped and includes first 58 and second 60 receiving surfaces for selectively receiving and engaging the back leg 36 thereagainst. In addition, the back surface 54 of the annular ring 48 defines a plurality of minor notches 59 disposed adjacent to and outwards of the respective plurality of major notches 56. Each of the plurality of minor notches 59 is also generally V-shaped and includes first 61 and second 63 engaging surfaces. The distal end 37 of each back leg 36 is positioned within the minor notch 59 and selectively abuts the first 61 and second 63 engaging surfaces. A narrow channel 65 interconnects the major notch 56 with the minor notch 59 and receives the back leg 36 therethrough.

The inner plate 50 includes an outer rim 47 surrounding the periphery of the annular ring 48 and an inner rim 49 sealed within the circular opening. The inner plate 50 further includes a plurality of apertures 51 extending through the inner rim 49 for receiving and rotatably supporting the respective plurality of shafts 26 therethrough. Thus, the inner plate 50 supports the plurality of shafts 26 adjacent each back leg 36 thereof. The annular ring 48 is rotatable relative to the inner 50 and outer 52 plates.

The rotation of the annular ring 48 causes one of the first 61 and second 63 engaging surfaces to urge the distal end 37 of the back legs 36 into movement, thereby moving the middle portion of the back leg 36 between the first 58 and second 60 receiving surfaces. This movement of the back legs 36 causes rotation of each of the plurality of shafts 26 about an axis 62 defined by the central segment 28 of each of the plurality of shafts 26.

Referring back to FIG. 2, a shield, generally indicated at 64, includes a plurality of panels or louvers 66 fixedly secured to the respective plurality of shafts 26. Certain ones of the plurality of panels or louvers 66 includes a cutout 72. It is appreciated that the shape of both the plurality of panels or louvers 66 and the cutouts 72 may vary. Each of the plurality of panels or louvers 66 includes a proximal end 73 fixedly secured to the central segment 28 of the respective plurality of shafts 26 and an opposing free distal end 75. As the plurality of shafts 26 is urged into rotation by the rotation of the annular ring 48, the shield 64 moves between a closed position, shown in FIGS. 1 and 2, and an open position, shown in FIGS. 4 and 5.

More specifically, when the shield 64 is in the closed position, the plurality of louvers or panels 66 extends in a side-by-side relationship to surround the light source 24 and block at least a portion of the light rays from projecting towards and reflecting off of the high beam reflector surfaces 22. In other words, the proximal end 73 of each of the plurality of panels or louvers 66 is disposed adjacent to the free distal end 75 of the neighboring panel 66 when the shield 64 is in the closed position. At the same time, two or more of the cutouts 72 cooperate with one another to form a generally continuous shape or pattern. As a result, when the shield 64 is in the closed position, the only light rays to reach the reflector 18 will be those that travel through the cutouts 72. The light rays that travel through the cutouts 72 are directed towards the low beam reflector surfaces 20, as shown in FIG. 1, from which they are reflected and then projected forward through the lens to produce the low beam pattern. The remaining light rays, that is, those light rays that do not travel through the cutouts 72, are blocked by the plurality of panels or louvers 66. Thus, when the shield 64 is in the closed or low beam position, the plurality of panels or louvers 66 prevents light rays from reaching the high beam reflector surfaces 22.

Figure 4:
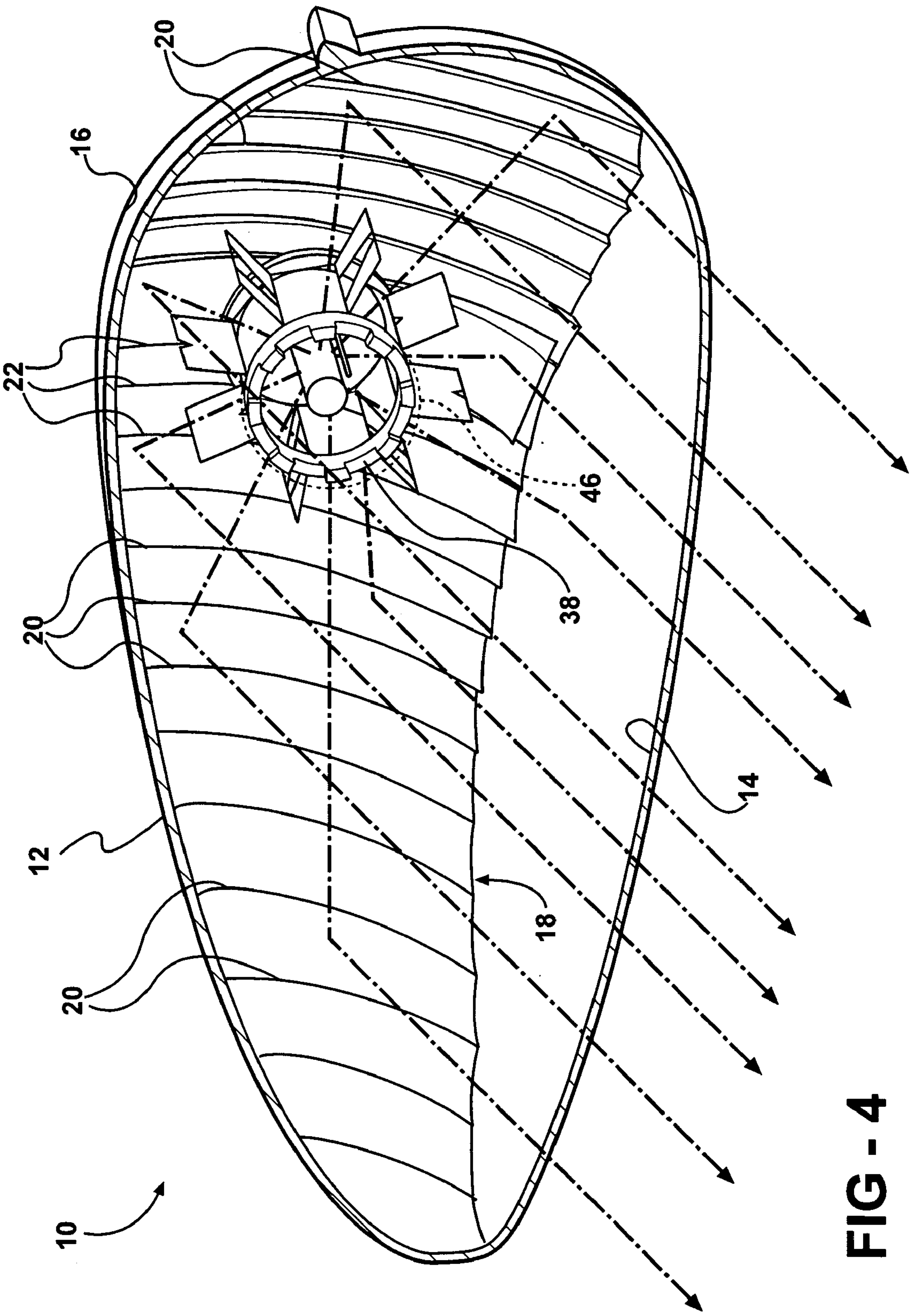
FIG. 4 is a perspective view of the headlamp assembly configured to produce a high beam pattern.
Figure 5:
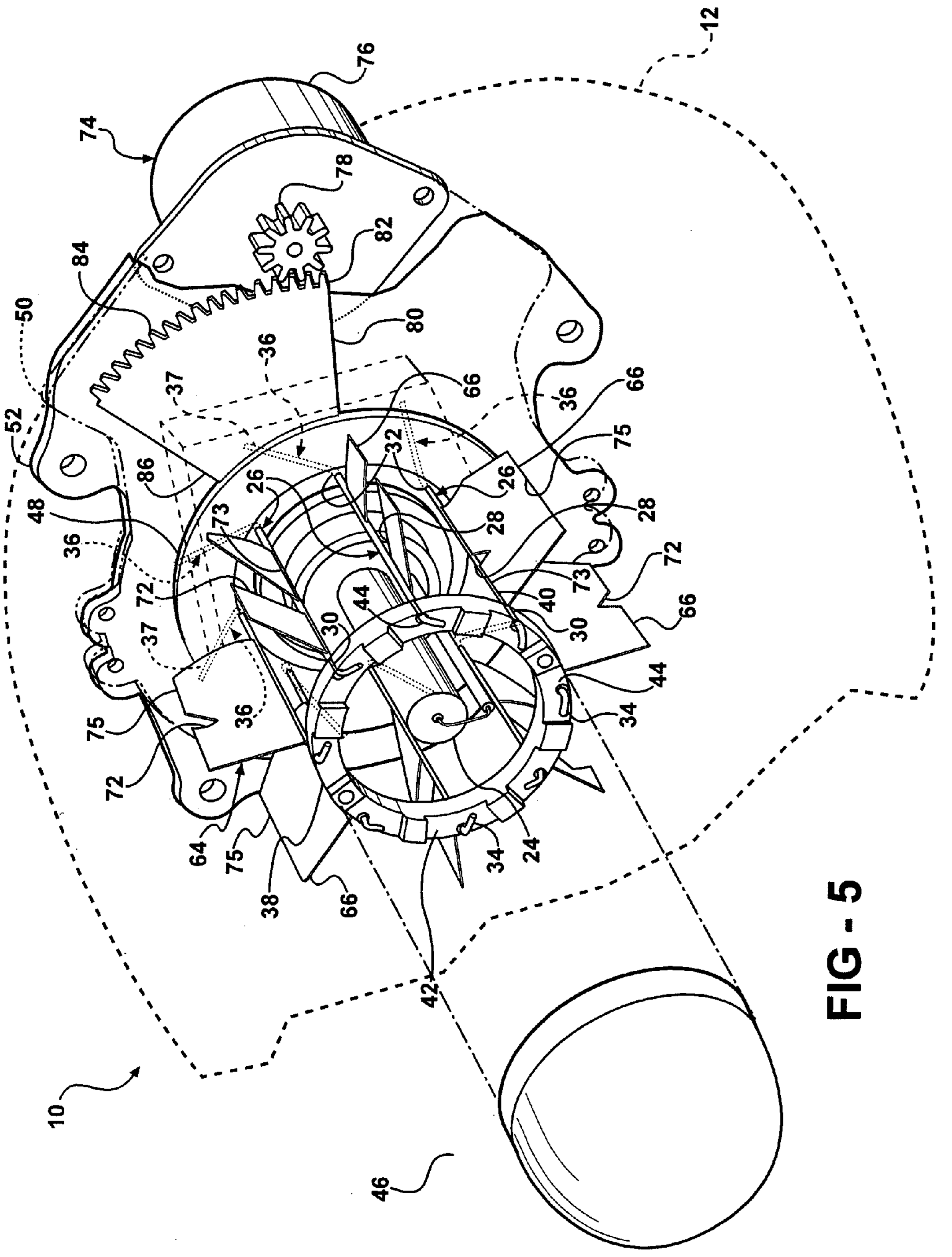
FIG. 5 is a fragmentary, perspective view of the headlamp assembly including the shield in an open position for producing the high beam pattern.

When the shield 64 is in the open or high beam position, as shown in FIGS. 4 and 5, the plurality of panels or louvers 66 are spaced apart from one another so that the space between each of the plurality of shafts 26 is unhindered. In other words, each of the plurality of panels or louvers 66 extends generally perpendicular to the annular side wall 40 of the support ring 38 so that the proximal end 73 of each of the plurality of panels or louvers 66 is spaced apart from the free distal end 75 of the neighboring panel 66. As a result, when the shield 64 is in the open position, all of the light rays emitted by the light source 24 reach the reflector 18. In other words, there is no structure blocking the light rays from reaching the reflector 18. More specifically, the light rays reflect off of the low 20 and high 22 beam reflector surfaces, as shown in FIG. 4, from which they project forward through the lens to produce the high beam pattern.

Referring to FIGS. 2 and 3, a drive, generally indicated at 74, is operatively connected to the plurality of shafts 26 to move the shield 64 between its closed and open positions. The drive 74 includes a motor 76 and a drive gear 78 operatively connected thereto. A sector gear 80 includes a first end 82 having a toothed portion 84 and an opposing second end 86. The toothed portion 84 engages the drive gear 78. Activation of the motor 76 rotates the drive gear 78 to move the sector gear 80 between a low beam position, shown in FIGS. 2 and 3, and a high beam position, shown in FIGS. 5 and 6. The annular ring 48 is coupled to the second end 86 of the sector gear 80. Thus, the movement of the sector gear 80 into the low and high beam positions rotates the annular ring 48 counterclockwise and clockwise, respectively. The rotation of the annular ring 48 rotates each of the plurality of shafts 26 about the axis 62.

Figure 6:
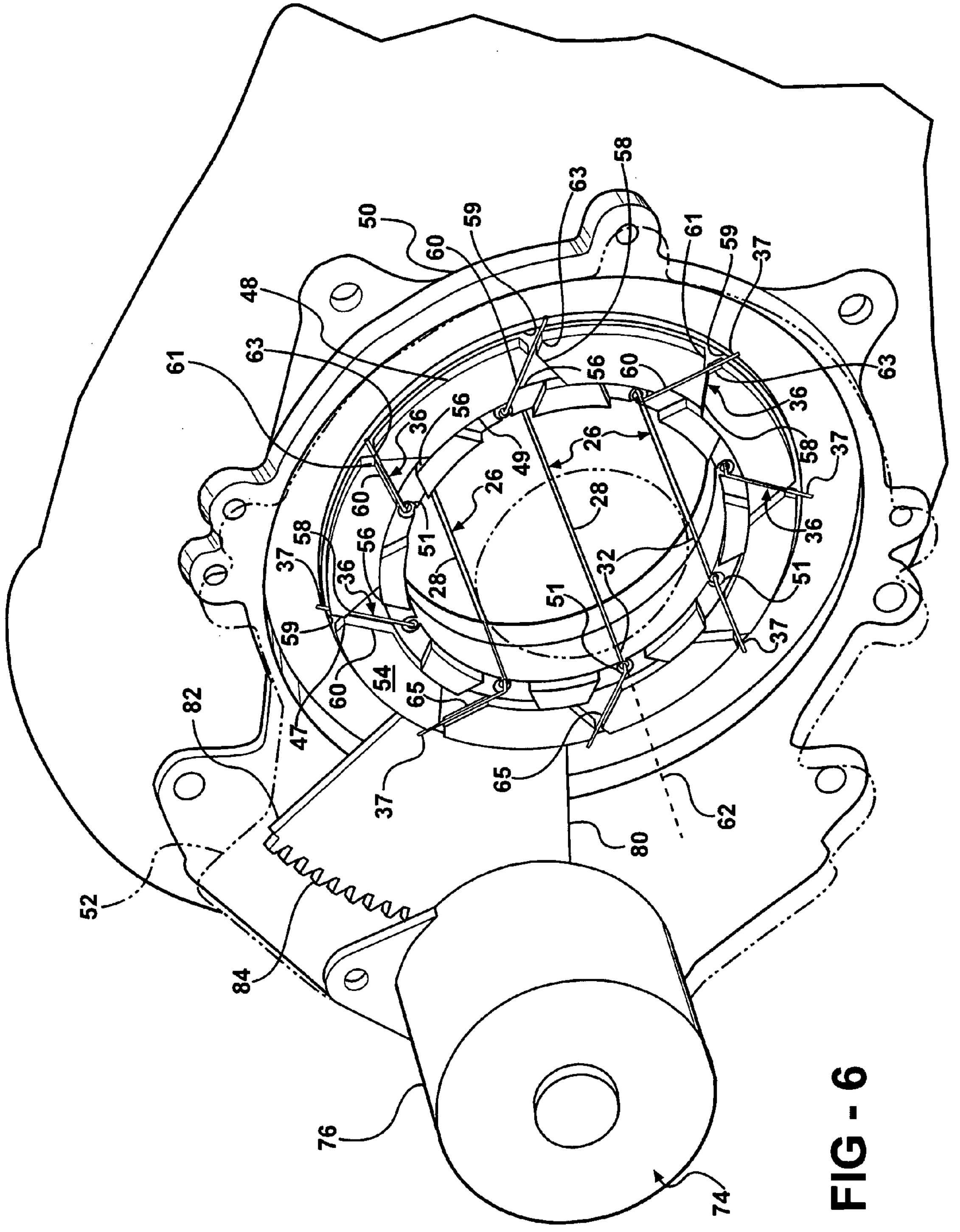
FIG. 6 is a rear, perspective view, partially cut away, of the headlamp assembly with the shield in the open position.

In operation, starting with the shield 64 in the closed or low beam position, as shown in FIGS. 1 through 3, so that the headlamp assembly 10 produces the low beam pattern, the motor 76 is activated to rotate the drive gear 78 in the clockwise direction, as viewed from FIG. 2. The drive gear 78 drivingly engages the toothed portion 84 of the sector gear 80, causing the sector gear 80 to move towards its low beam position. This movement of the sector gear 80 rotates the annular ring 48 in the counterclockwise direction. The rotation of the circular plate 48 causes the first engaging surface 61 of the minor notch 59 to urge the distal end 37 of each of the back legs 36 into movement, which initiates counterclockwise rotation of the plurality of shafts 26 about the axis 62. At the same time, the plurality of panels or louvers 66 rotates with the respective plurality of shafts 26. When the sector gear 80 reaches its high beam position, shown in FIG. 5, the middle portion of each back leg 36 is received against the second receiving surface 60 of the major notch 56 and the distal end 37 of each back leg 36 abuts the second engaging surface 63 of the minor notch 59, as shown in FIG. 6. As a result, rotation of the plurality of shafts 26 ends and the shield 64 is in its open position, as shown in FIGS. 4 and 5. When the shield 64 is in the open or high beam position, light rays from the light source 24 extend unimpeded through the space between each of the plurality of shafts 26. The light rays reflect off of the low 20 and high 22 beam reflector surfaces to produce the high beam pattern.

To close the shield 64 so that the headlamp assembly 10 produces the low beam pattern, the motor 76 is activated to rotate the drive gear 78 in the counterclockwise direction. The drive gear 78 drivingly engages the toothed portion 84 of the sector gear 80, causing the sector gear 80 to move towards its low beam position. This movement of the sector gear 80 rotates the annular ring 48 in the clockwise direction. The rotation of the circular plate 48 causes the second engaging surface 63 of the minor notch 59 to urge the distal end 37 of each back leg 36 into movement, which initiates clockwise rotation of the plurality of shafts 26. At the same time, the plurality of panels or louvers 66 rotates with the respective plurality of shafts 26. When the sector gear 80 reaches its low beam position, shown in FIG. 2, the middle portion of each back leg 36 is received against the first receiving surface 58 of the major notch 56 and the distal end 37 of each back leg 36 abuts the first engaging surface 61 of the minor notch 59, as shown in FIG. 3. As a result, rotation of the plurality of shafts 26 ends and the shield 64 is in its closed position, as shown in FIGS. 1 and 2. When the shield 64 is in the closed position, light rays from the light source 24 extend only through the cutouts 72. The cutouts 72 direct the light rays to reflect off of the low beam reflector surfaces 20, from which they are then projected forward through the lens in the low beam pattern.

Figure 7:
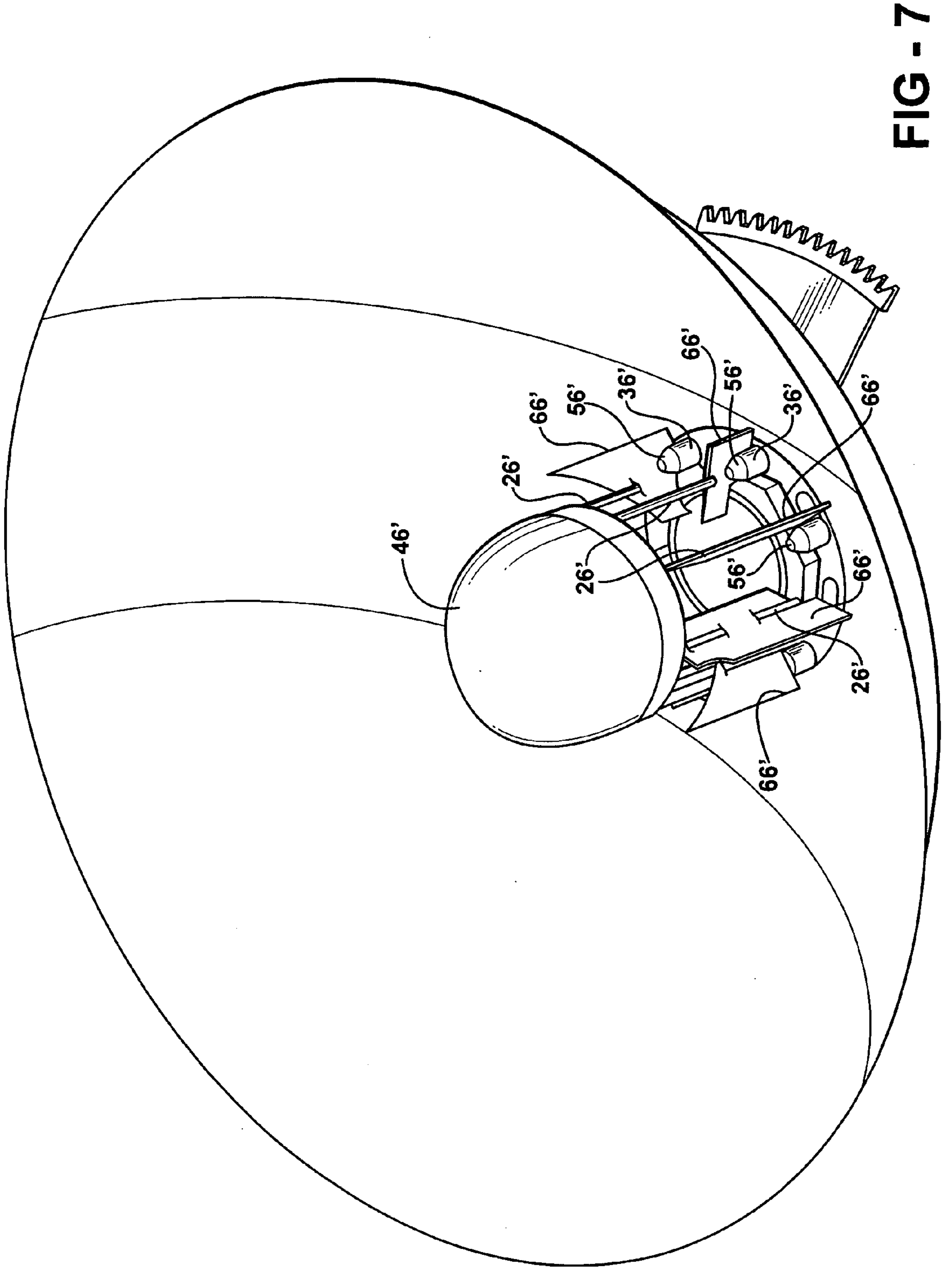
FIG. 7 is a perspective view of a second embodiment of the shield assembly of the present invention, with the vanes open.
Figure 8:
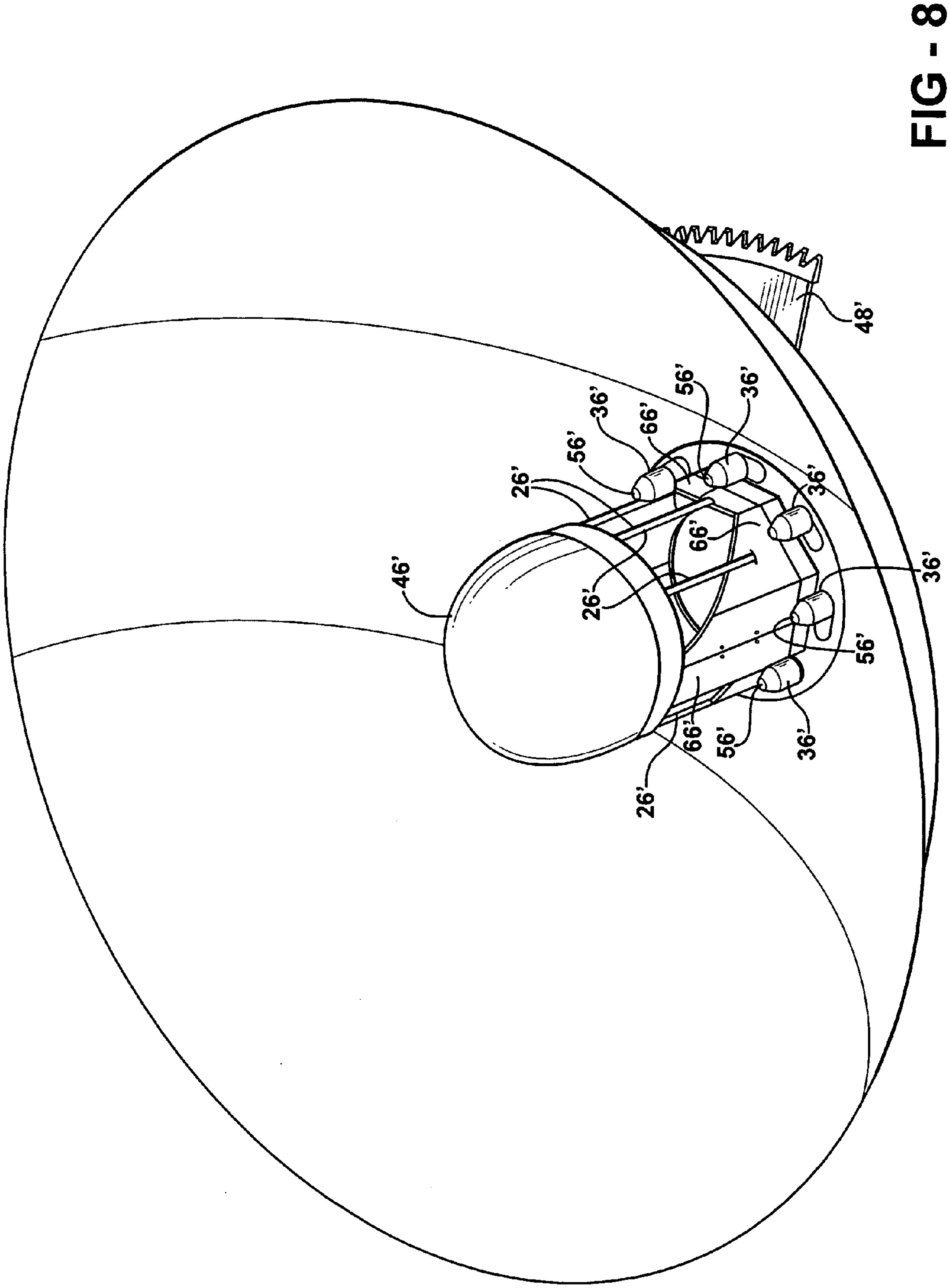
FIG. 8 is a perspective view of the embodiment in FIG. 7, with the vanes closed.

Referring to FIGS. 7 and 8, a second embodiment of the present invention is illustrated. In this embodiment, the plurality of shafts 26' are fixedly mounted and the louvers 66' are pivotally mounted on the shafts 26'. The louvers 66' are provided with a flexible loop 36' and the ring 48' is provided with pins 56' to provide the operative engagement between the drive motor and the louvers 66' to open and close the shield. A bulb cap 46' engages and supports the ends of shafts 26'. Cap 46 also closes the end for purposes of light transmission.

The invention has been described in an illustrative manner. It is to be understood that the terminology, which has been used, is intended to be in the nature of words of description rather than of limitation. Many modifications and variations of the invention are possible in light of the above teachings. Therefore, within the scope of the appended claims, the invention may be practiced other than as specifically described.

What is claimed:

1. A headlamp assembly for producing high and low beam patterns, said headlamp assembly comprising:

- a housing including a reflector having high and low beam reflector surfaces;
- a light source disposed within said housing for producing light rays projecting towards said high and low beam reflector surfaces;
- a movable shield operatively mounted about said light source, said shield including a plurality of louvers secured to a respective plurality of shafts wherein said plurality of louvers surrounds said light source, certain ones of said plurality of louvers including a cutout;
- a drive operatively connected to said shield for effecting movement thereof between a low beam position and a high beam position; and
- said shield configured to block light emitted from said light source and projected towards said high beam reflector surfaces and allow light to project through said cutouts of said shield towards said low beam reflector surfaces when said shield is in said low beam position, and allow light emitted from said light source to project towards both said high and low beam reflector surfaces when in said high beam position.

2. A headlamp assembly as set forth in claim 1 wherein said plurality of louvers are mounted for ganged movement between said low beam and high beam positions.

3. A headlamp assembly as set forth in claim 2 wherein each of said louvers operatively engage a ring whereby rotation of said ring cooperatively moves said louvers.

4. A headlamp assembly as set forth in claim 3 wherein said drive includes a motor operatively connected to said circular plate for rotation thereof.

5. A headlamp assembly as set forth in claim 4 wherein said ring includes a sector gear and said motor drives said sector gear.

* * * * *